United States Patent Office 2,964,553
Patented Dec. 13, 1960

2,964,553

MANUFACTURE OF NITRILES

Frederick Keith Duxbury and Owen Burchell Edgar, Manchester, England, assignors to Imperial Chemical Industries Limited, London, England, a corporation of Great Britain No Drawing. Filed Sept. 30, 1957, Ser. No. 686,871

Claims priority, application Great Britain Oct. 3, 1956

5 Claims. (Cl. 260—465.2)

This invention relates to improvements in or relating to the manufacture of nitriles, and more particularly to the manufacture of ester nitriles.

It is known to manufacture nitriles by heating carboxylic acids, or esters thereof, with ammonia in the presence of catalysts. It has been proposed in U.K. specification No. 568,941 to manufacture aliphatic dinitriles by passing anhydrous ammonia into a heated liquid half ester of an aliphatic dicarboxylic acid containing at least three carbon atoms, optionally in the presence of a nitrile-forming catalyst. In the said specification it is disclosed that some ester-nitrile is also formed as a by-product, but this is always in only minor amount, and the dinitrile is the principal product.

We have now found that the ester nitrile may be obtained in considerably improved yield, with the formation of smaller proportions of the dinitrile, when the half-ester of the dibasic acid is reacted with ammonia in the vapour phase in the presence of a dehydrating catalyst, and especially when the half-ester used is a secondary alkyl half-ester.

Thus according to our invention we provide an improved process for the manufacture of ester nitriles by heating a half-ester of a dicarboxylic acid containing at least three carbon atoms with ammonia in the presence of a dehydrating catalyst characterised in that the reaction is carried out in the vapour phase.

The half-esters may be manufactured in known manner, for example by reaction between the dibasic acid and the appropriate alcohol in the presence of the corresponding di-ester, by the method described in the Journal of Organic Chemistry, 1947, volume 12, page 163, for the preparation of ethyl hydrogen adipate.

As dibasic acids of which the half-esters are suitable for the process of our invention, there may particularly be mentioned aliphatic dibasic acids for example adipic, pimelic, suberic, azelaic and sebacic acids, but there may also be used aromatic dibasic acids for example phthalic, isophthalic, terephthalic and p-carboxy phenyl acetic acids. The half-esters may be primary alkyl, for example the ethyl, half-esters but it is preferred to use secondary alkyl, for example the isopropyl, sec-butyl, and sec-amyl half-esters, since thereby the proportion of the ester nitrile formed during the process of our invention is still further increased.

The dehydrating catalyst may be any catalyst suitable for use in manufacture of nitriles from mixtures of carboxylic acids and ammonia, for example silica gel, phosphoric acid and derivatives of phosphoric acid, and preferably boron phosphate. The proportion of ammonia to be used may be from 3 to 10 moles of ammonia for each mole of half-ester.

The reaction may be carried out at a temperature between 275° C. and 400° C., preferably between 300° C. and 350° C. Conveniently, the reaction may be carried out by mixing the vapours of the half-ester and ammonia, and passing the mixture through a tubular vessel containing the catalyst and maintained at the selected temperature, at substantially atmospheric pressure. Depending upon the volatility of the particular half-ester and the particular temperature selected, the reaction may be carried out at pressures above or below atmospheric pressure if so desired.

The time for which the vapours are in contact with the catalyst will necessarily vary, but a contact time of between 1 and 20 seconds is usually sufficient.

The desired ester nitriles may be isolated by the methods commonly used in the art, for example by condensing the effluent vapours from the reaction vessel, and fractionally distilling the condensate, preferably under reduced pressure, and optionally after separating mechanically any aqueous layer which may have formed.

The nitrile esters are of value as intermediates in chemical synthesis, in particular as intermediates in the manufacture of polyamides. By the process of our invention, these ester nitriles may be obtained very readily and conveniently and in good yield, without the necessity of separation from large amounts of dinitriles. For example, using mono-isopropyl adipate in the process of our invention, there is obtained a mixture of isopropyl ω-cyanovalerate and adiponitrile in the ratio of more than 8:1, whereas the prior art processes yield mixtures of these two products in a ratio less than 1:1.

The invention is illustrated but not limited by the following examples.

*Example 1*

399 grams of iso-propyl hydrogen adipate are vapourised at a rate of 133 grams per hour, the vapour is mixed with a stream of ammmonia gas (42 grams per hour) and the mixture is passed over 300 mls. of granulated boron phosphate, heated to between 300° C. and 320° C. The molecular ratio of ammonia to ester is 3.5:1 and the contact time is approximately 7 seconds.

The vapour mixture after contact with the catalyst is condensed by cooling and the condensate separates into two immiscible layers. The upper layer, consisting of a yellow oil, is washed with an aqueous sodium chloride solution containing 200 grams per litre, and is then fractionally distilled. There are obtained 292 grams of iso-propyl ω-cyano valerate, boiling at 83° C. at a pressure of 0.5 mm. mercury and 15 grams of adiponitrile, boiling at 110° C. at a pressure of 0.5 mm. of mercury.

Acidification of the combined aqueous layer yields 20 grams of iso-propyl hydrogen adipate.

The molecular conversion to ester-nitrile and adiponitrile is 81% and 7% respectively. No allowance has been made for the recovered iso-propyl hydrogen adipate.

*Example 2*

600 grams of iso-propyl hydrogen adipate are vapourised at a rate of 100 grams per hour, the vapour is mixed with a stream of ammonia gas (27 grams per hour) and the mixture is passed over 300 mls. of granulated boron phosphate, heated to between 315° C. and 320° C. The molecular ratio of ammonia to ester is 3:1 and the contact time is approximately 11 seconds.

The vapour mixture, after contact with the catalyst, is condensed by cooling and the condensate separates into two immiscible layers. The upper layer, consisting of a yellow oil, is washed as described in Example 1 and is then fractionally distilled. There are obtained 400 grams of iso-propyl ω-cyano valerate boiling at 92° C. at a pressure of 1.3 mm. mercury, and 38 grams of adiponitrile boiling at 115° C. at a pressure of 0.9 mm. of mercury.

Acidification of the combined aqueous layer and washings yields 30 grams of iso-propyl hydrogen adipate. The molecular conversion to ester-nitrile and adiponitrile is 78% and 12% respectively, after allowance has been made for the recovered iso-propyl hydrogen adipate.

Example 3

480 grams of iso-propyl hydrogen pimelate are vapourised at a rate of 120 grams per hour, the vapour is mixed with a stream of ammonia gas (68 grams per hour) and the mixture is passed over 300 mls. of granulated boron phosphate, heated to between 285° C. and 295° C. The molecular ratio of ammonia to ester is 6:1 and the contact time is approximately 2.5 seconds.

The vapour mixture, after contact with the catalyst, is condensed by cooling and the condensate separates into two immiscible layers. The upper layer, consisting of a yellow oil, is washed as described in Example 1 and is then fractionally distilled. There are obtained 285 g. of iso-propyl ω-cyano caproate boiling between 78° C. and 81° C. at a pressure of 0.18 mm. of mercury, and 37 g. of pimelonitrile, boiling between 96° C. and 100° C. at a pressure of 0.15 mm. of mercury.

Acidification of the combined aqueous layer and washings yielded 50 g. of iso-propyl hydrogen pimelate. The molecular conversion to ester-nitrile and pimelonitrile is 73% and 14% respectively, after allowance has been made for the recovered iso-propyl hydrogen pimelate.

Example 4

240 grams of n-propyl hydrogen adipate are vapourised at a rate of 133 grams per hour, the vapour is mixed with a stream of ammonia gas (45 grams per hour) and the mixture is passed over 300 mls. of granulated boron phosphate, heated to between 300° C. and 320° C. The molecular ratio of ammonia to ester is 3.7:1 and the contact time is approximately 7 seconds.

The vapour mixture after contact with the catalyst is condensed by cooling and the condensate separates into two immiscible layers. The upper layer is washed as described in Example 1 and then fractionally distilled. There are obtained 140 grams of n-propyl ω-cyano valerate boiling at 100° C. at a pressure of 1.2 mm. of mercury, and 13 grams of adiponitrile boiling at 125° C. at a pressure of 1.2 mm. of mercury.

Acidification of the combined aqueous layer and washings yields 7 gms. of n-propyl hydrogen adipate.

The molecular conversion to ester-nitrile and adiponitrile is 70% and 10% respectively, after allowance has been made for the recovered n-propyl hydrogen adipate.

Example 5

282 grams of sec-butyl hydrogen adipate are vapourised at a rate of 141 grams per hour, the vapour is mixed with a stream of ammonia gas (45 grams per hour) and the mixture is passed over 300 mls. of granulated boron phosphate, heated to between 300° C. and 320° C. The molecular ratio of ammonia to ester is 3.7:1 and the contact time is approximately 7 seconds.

The vapour mixture, after contact with the catalyst, is condensed by cooling and the condensate separates into two immiscible layers. The upper layer, consisting of a yellow oil, is washed as described in Example 1 and is then fractionally distilled. There are obtained 185 grams of sec-butyl ω-cyano valerate, boiling at 154° C. at a pressure of 13.5 mm. of mercury. No adiponitrile was isolated.

Acidification of the combined aqueous layer and washings yields 27 grams of sec-butyl hydrogen adipate.

The molecular conversion to ester-nitrile is 80%, after allowance has been made for the recovered sec-butyl hydrogen adipate.

Example 6

282 grams of n-butyl hydrogen adipate are vapourised at a rate of 141 grams per hour, the vapour is mixed with a stream of ammonia (45 grams per hour) and the mixture is passed over 300 mls. of granulated boron phosphate, heated to between 300° C. and 320 C. The molecular ratio of ammonia to ester is 3.7:1 and the contact time is approximately 7 seconds.

The vapour mixture after contact with the catalyst is condensed by cooling and the condensate separates into two immiscible layers. The upper layer, consisting of a yellow oil, is washed as described in Example 1 and is then fractionally distilled. There are obtained 177 grams of n-butyl ω-cyano valerate, boiling at 151° C. at a pressure of 13.5 mm. of mercury and 12 g. of adiponitrile, boiling at 125° C. at a pressure of 1.2 mm. of mercury.

Acidification of the combined aqueous layer and washings yields 7 grams of n-butyl hydrogen adipate.

The molecular conversion to ester-nitrile and adiponitrile is 71% and 8% respectively, after allowance has been made for the recovered n-butyl hydrogen adipate.

Example 7

282 grams of iso-butyl hydrogen adipate are vapourised at a rate of 141 grams per hour, the vapour is mixed with a stream of ammonia gas (45 grams per hour) and the mixture is passed over 300 mls. of granulated boron phosphate, heated to between 300° C. and 320° C. The molecular ratio of ammonia to ester is 3.7:1 and the contact time is approximately 7 seconds.

The vapour mixture, after contact with the catalyst, is condensed by cooling and the condensate separates into two immiscible layers. The upper layer, consisting of a yellow oil, is washed as described in Example 1 and is then fractionally distilled. There are obtained 193 grams of iso-butyl ω-cyano valerate, boiling at 139° C. at a pressure of 15 mm. of mercury. No adiponitrile was isolated.

Acidification of the combined aqueous layer and washings yields 7 grams of iso-butyl hydrogen adipate.

The molecular conversion to ester-nitrile is 78%, after allowance has been made for the recovered iso-butyl hydrogen adipate.

Example 8

1,218 grams of ethyl hydrogen adipate are vapourised at a rate of 210 grams per hour, the vapour is mixed with a stream of ammonia gas (61 grams per hour) and the mixture is passed over 400 mls. of granulated boron phosphate, heated to between 300° C. and 320° C. The molecular ratio of ammonia to ester is 3:1 and the contact time is approximately 6 seconds.

The vapour mixture after contact with the catalyst is condensed by cooling and the condensate separates into two immiscible layers. The upper layer, consisting of a brown oil, is washed as described in Example 1 and is then fractionally distilled. There are obtained 607 grams of ethyl ω-cyano valerate, boiling at 145° C. at a pressure of 15 mm. of mercury and 86.5 grams of adiponitrile, boiling at 160° C. at a pressure of 17 mm. of mercury.

Acidification of the combined aqueous layer and washings yields 110 grams of ethyl hydrogen adipate.

The molecular conversion to ester-nitrile and adiponitrile is 61.5% and 13% respectively, after allowance has been made for the recovered ethyl hydrogen adipate.

What we claim is:

1. A process for the manufacture of a lower alkyl ester of an ω-cyano unsubstituted saturated aliphatic carboxylic acid, said acid containing from 6 to 10 carbon atoms which comprises heating for a time not greater than about 20 seconds, a lower alkyl half-ester of an unsubstituted saturated aliphatic dicarboxylic acid, said acid containing from 6 to 10 carbon atoms, with ammonia in the presence of a dehydrating catalyst, said reaction being carried out in the vapor phase using from about 3 to 10 moles of ammonia for each mole of half-ester.

2. Process as claimed in claim 1 wherein the half-esters used are secondary alkyl half-esters.

3. Process as claimed in claim 1 wherein the dehydrating catalyst is boron phosphate.

4. Process as claimed in claim 1 wherein the reaction is carried out at a temperature between 275° C. and 400° C.

5. Process as claimed in claim 1 wherein the reaction is carried out at a temperature between 300° C. and 350° C.

References Cited in the file of this patent
UNITED STATES PATENTS 2,590,986    MacLean et al. _____ Apr. 1, 1952

FOREIGN PATENTS 568,941    Great Britain _____ Oct. 3, 1956